US009971422B2

(12) United States Patent
Geller et al.

(10) Patent No.: US 9,971,422 B2
(45) Date of Patent: May 15, 2018

(54) OBJECT ORIENTATION DETECTION WITH A DIGITIZER

(71) Applicant: Microsoft Technology Licensing, LLC, Redmond, WA (US)

(72) Inventors: Ilan Geller, Pardesia (IL); Yuval Stern, Even-Yehuda (IL); Alex Kalmanovich, Holon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 14/933,110

(22) Filed: Nov. 5, 2015

(65) Prior Publication Data

US 2016/0062492 A1     Mar. 3, 2016

Related U.S. Application Data

(63) Continuation of application No. 13/703,390, filed as application No. PCT/IL2011/000455 on Jun. 9, 2011, now Pat. No. 9,864,440.

(60) Provisional application No. 61/354,081, filed on Jun. 11, 2010.

(51) Int. Cl.
*G06F 3/0354* (2013.01)
*G06F 3/046* (2006.01)
*G06F 3/033* (2013.01)
*G06F 3/041* (2006.01)

(52) U.S. Cl.
CPC .......... *G06F 3/03545* (2013.01); *G06F 3/033* (2013.01); *G06F 3/046* (2013.01); *G06F 3/0416* (2013.01); *G06F 2203/04104* (2013.01); *G06F 2203/04106* (2013.01)

(58) Field of Classification Search
CPC ...... G06F 3/03545; G06F 3/046; G06F 3/033; G06F 3/0416; G06F 2203/04106; G06F 2203/04104
See application file for complete search history.

(56) References Cited

U.S. PATENT DOCUMENTS

| 5,117,071 A * | 5/1992 | Greanias ............. G06F 3/03545 345/174 |
| 5,408,055 A | 4/1995 | Harris et al. |
| 5,414,227 A | 5/1995 | Schubert et al. |

(Continued)

FOREIGN PATENT DOCUMENTS

| JP | 2006-092410 | 4/2006 |
| JP | 2010-009542 | 1/2010 |
| WO | WO 2011/154950 | 12/2011 |

OTHER PUBLICATIONS

Official Action dated Aug. 25, 2016 From the US Patent and Trademark Office Re. U.S. Appl. No. 14/931,905.
Official Action dated May 25, 2017 From the US Patent and Trademark Office Re. U.S. Appl. No. 13/703,390. (20 pages).

(Continued)

*Primary Examiner* — Abbas Abdulselam

(57) ABSTRACT

A digitizer system includes a stylus comprising a plurality of transmitters for transmitting signals, wherein each of the plurality of transmitters are distanced from one another by a defined distance, a digitizer sensor operable for sensing signals transmitted by the plurality of transmitters, and circuitry associated with the digitizer sensor for tracking a projected location on the digitizer sensor of each of the plurality of transmitters based on the signals sensed, and for tracking a geometric relationship between the projected locations.

20 Claims, 11 Drawing Sheets

(56) References Cited

U.S. PATENT DOCUMENTS

| | | | |
|---|---|---|---|
| 5,644,108 | A | 7/1997 | Katsurahira et al. |
| 6,058,485 | A | 5/2000 | Koziuk et al. |
| 6,133,906 | A | 10/2000 | Geaghan |
| 6,184,873 | B1 | 2/2001 | Ward et al. |
| 6,489,899 | B1 | 12/2002 | Fly et al. |
| 6,690,156 | B1 | 2/2004 | Weiner et al. |
| 7,292,229 | B2 | 11/2007 | Morag et al. |
| 7,372,455 | B2 | 5/2008 | Perski et al. |
| 8,638,320 | B2 | 1/2014 | Harley et al. |
| 2002/0084114 | A1 | 7/2002 | Xu et al. |
| 2004/0095333 | A1 | 5/2004 | Morag et al. |
| 2004/0160429 | A1* | 8/2004 | Blake ............... G06F 3/043 345/179 |
| 2005/0133700 | A1 | 6/2005 | Buermann et al. |
| 2005/0140663 | A1* | 6/2005 | Nakamura ........... G06F 1/1626 345/179 |
| 2005/0162411 | A1 | 7/2005 | Berkel van |
| 2006/0227151 | A1 | 10/2006 | Bannai |
| 2008/0012835 | A1 | 1/2008 | Rimon et al. |
| 2008/0128180 | A1 | 6/2008 | Perski et al. |
| 2009/0128516 | A1 | 5/2009 | Rimon et al. |
| 2009/0175491 | A1* | 7/2009 | Charpentier ....... G06K 9/00885 382/100 |
| 2010/0051356 | A1 | 3/2010 | Stern et al. |
| 2010/0155153 | A1* | 6/2010 | Zachut ............... G06F 3/03545 178/18.03 |
| 2010/0220078 | A1 | 9/2010 | Zloter et al. |
| 2010/0302152 | A1 | 12/2010 | Kirigaya |
| 2013/0088465 | A1 | 4/2013 | Geller et al. |
| 2016/0054811 | A1 | 2/2016 | Geller et al. |

OTHER PUBLICATIONS

Official Action dated Jun. 7, 2017 From the US Patent and Trademark Office Re. U.S. Appl. No. 14/931,905. (13 pages).
Official Action dated Mar. 3, 2016 From the US Patent and Trademark Office Re. U.S. Appl. No. 14/931,905.
Official Action dated Mar. 9, 2016 From the US Patent and Trademark Office Re. U.S. Appl. No. 13/703,390.
International Preliminary Report on Patentability dated Dec. 6, 2012 From the International Preliminary Examining Authority Re. Application No. PCT/IL2011/000455.
International Search Report and the Written Opinion dated Oct. 5, 2011 From the International Searching Authority Re. Application No. PCT/IL2011/000455.
Official Action dated Sep. 3, 2015 From the US Patent and Trademark Office Re. U.S. Appl. No. 13/703,390.
Official Action dated Apr. 23, 2015 From the US Patent and Trademark Office Re. U.S. Appl. No. 13/703,390.
Official Action dated Oct. 27, 2014 From the US Patent and Trademark Office Re. U.S. Appl. No. 13/703,390.
Written Opinion dated Sep. 7, 2012 From the International Preliminary Examining Authority Re. Application No. PCT/IL2011/000455.
Written Opinion dated Aug. 14, 2012 From the International Preliminary Examining Authority Re. Application No. PCT/IL2011/000455.
Official Action dated Dec. 29, 2016 From the US Patent and Trademark Office Re. U.S. Appl. No. 14/931,905. (15 pages).
Communication Pursuant to Article 94(3) EPC dated Dec. 18, 2017 From the European Patent Office Re. Application No. 11731136.5. (4 Pages).

* cited by examiner

US 9,971,422 B2

OBJECT ORIENTATION DETECTION WITH A DIGITIZER

RELATED APPLICATIONS

This application is a continuation of U.S. patent application Ser. No. 13/703,390, filed on Dec. 11, 2012, which is a National Phase of PCT Patent Application No. PCT/IL2011/000455 having International filing date of Jun. 9, 2011, which claims the benefit of priority under 35 USC § 119(e) of U.S. Provisional Patent Application No. 61/354,081 filed on Jun. 11, 2010. The contents of the above applications are all incorporated by reference as if fully set forth herein in their entirety.

FIELD OF THE INVENTION

The present invention, in some embodiments thereof, relates to a digitizer system and, more particularly, but not exclusively, to a stylus operated digitizer system.

BACKGROUND OF THE INVENTION

Digitizer systems are used as computer input devices for capturing data or handwritten signatures, text, drawings, symbols or the like. Digitizing tablets and/or touch screens are exemplary digitizer systems used to replace a mouse as a primary pointing and navigation device for desktop computers. A user interacts with the digitizer system by positioning and moving an object such as stylus and/or a finger over a sensing surface of the system, e.g. a tablet and/or a touch screen. Position of the object with respect to the sensing surface is tracked by the digitizer system and interpreted as a user command. An electromagnetic stylus is one type of stylus known in the art for operating a digitizer system. The electromagnetic stylus operates by emitting an electromagnetic signal that can be picked up at locations on the sensing surface of the system. Position detection can typically be performed while the object is either touching and/or hovering over the sensing surface.

U.S. Pat. No. 6,690,156 entitled "Physical Object Location Apparatus and Method and a Platform using the same," U.S. Pat. No. 7,292,229 entitled "Transparent Digitizer," and U.S. Pat. No. 7,372,455 entitled "Touch Detection for a Digitizer," all of which are assigned to N-trig Ltd., the contents of all of which are incorporated herein by reference, describe a device for detecting objects disposed in association with a graphical display device. The device includes a transparent sensing arrangement of detectors located on the display screen that provide output to detect a location of the object in relation to the display screen.

In U.S. Pat. No. 7,292,229 there is also described an electromagnetic stylus designed to generate an electric field concentration in the vicinity of the front tip so that a location of the stylus with respect to the display screen can be accurately determined. It is described that the stylus can optionally also generate an electric field concentration in the vicinity a reverse tip located at a second end remote from the front tip for detecting location during an eraser event. Variations in the electric field generated at each of the tips can be introduced to differentiate between an eraser event and a front tip event.

U.S. Patent Application Publication No. 20080128180 entitled "Position Detecting System and Apparatuses and Methods for Use and Control Thereof," assigned to N-Trig Ltd, which is incorporated herein by reference, describes a pointer such as an electromagnetic stylus including a wave generating oscillator section for generating a signal to be detected by a digitizer sensor. Although, the wave generating oscillator section can be powered by an energy pick-up circuit, it is able to generate signals with a frequency that is independent from a frequency of the energy pick-up circuit.

U.S. Patent Application Publication No. 20080012835 entitled "Hover and Touch Detection for a Digitizer," assigned to N-trig Ltd, which is incorporated herein by reference, describes a system and method using both touch and hover of an object to interact with a digitizer sensor. It is described that a detected and/or recognized hover input signals can be implemented for controlling cursor position, for predicting the oncoming of a finger touch event, and for distinguishing between touch intended for user interaction and touch not intended for user interaction. A method for distinguishing between a touch and hover event based on a spatial pattern of signals received on the digitizer sensor is described.

U.S. Patent Application Publication No. 20100051356 entitled "Pressure Sensitive Stylus for a Digitizer," assigned to N-trig Ltd, which is incorporated herein by reference, describes a stylus including an optical sensor enclosed within a housing of the stylus for optically sensing displacement of a tip of the stylus in response to applied contact pressure.

U.S. Pat. No. 6,489,899 entitled "Position Detector," which is incorporated herein by reference, describes a digitizer system including a multiplicity of loop coils arranged in parallel with one another in X- and Y-directions for detecting position and orientation of a magnetic field generator embedded in an object such as a stylus or a game piece used for interacting with the digitizer system. Each of the loop coils is described to extend over a sensing surface in a geometrically varying manner having different characteristic dimensions along the measurement path so that relative position and orientation of the object in a sensing plane of the digitizer can be determined. There is also described a game piece that includes two magnetic field generators separated from each other by a predetermined distance and which are operable to generate different magnetic fields in substantially different directions. It is described that complete relative orientation between the sensor and an object including two magnetic field generators can be determined based on determined position and orientation of each of the generators along the sensor surface.

SUMMARY OF THE INVENTION

According to an aspect of some embodiments of the present invention there is provided an object for interacting with a digitizer sensor, the object operable to transmit signals from a plurality of different locations on (and/or within) the object. According to an aspect of some embodiments of the present invention there is also provided a digitizer system operable to track each of a plurality of signals emitted from a single object. According to some embodiments of the present invention, the system is operable to identify the projected locations of emission on the digitizer sensor and based on the projected locations determine information related to position of the object in the three-dimensional space. In some exemplary embodiments, an orientation of the object during interaction with the digitizer sensor is determined based on the projected locations. In some exemplary embodiments, a user command such as a gesture made with the object is identified based on the projected locations. In some exemplary embodiments, a user holding the object and interacting with the digitizer sensor is identified based on the projected locations. In some exemplary embodiments, a signature made with the object is verified based on the projected locations.

According to an aspect of some embodiments of the present invention there is provided a digitizer system comprising a stylus comprising a plurality of transmitters for transmitting signals, wherein each of the plurality of transmitters are distanced from one another by a defined distance, a digitizer sensor operable for sensing signals transmitted by the plurality of transmitters, and circuitry associated with the digitizer sensor for tracking a projected location on the digitizer sensor of each of the plurality of transmitters based on the signals sensed, and for tracking a geometric relationship between the projected locations.

Optionally, each of the projected locations is an area on the digitizer sensor from where signals from one of the plurality of transmitters are sensed.

Optionally, each of the projected locations is a point on the digitizer sensor from where signals from one of the plurality of transmitters are sensed.

Optionally, the geometric relationship that is tracked is a distance between projected locations of two transmitters of the plurality of transmitters.

Optionally, the geometric relationship that is tracked is an angle of a line defined between projected locations of two transmitters of the plurality of transmitters and an axis of the digitizer sensor.

Optionally, the stylus includes a writing tip and wherein one of the plurality of transmitters transmits a signal from around the writing tip of the stylus.

Optionally, the signal transmitted around the writing tip of the stylus is an electric field.

Optionally, the writing tip of the stylus is associated with a tip sensor for sensing pressure applied on the writing tip and wherein the signal transmitted around the writing tip of the stylus is altered in response to output of the tip sensor.

Optionally, the circuitry is operable to differentiate between a signal transmitted from around the writing tip of the stylus and a signal transmitted from another transmitter of the plurality of transmitters.

Optionally, at least two transmitters of the plurality of transmitters are aligned along a longitudinal axis of the stylus.

Optionally, at least one of the transmitters of the plurality of transmitters is positioned off a longitudinal axis of the stylus.

Optionally, the stylus includes a signal generator for generating an oscillating signal.

Optionally, the stylus comprises an encoder for encoding a signal generated by the signal generator.

Optionally, a signal transmitted by at least one of the plurality of transmitters is an encoded signal.

Optionally, at least one of the plurality of transmitters is configured to periodically transmit signal bursts.

Optionally, the plurality of transmitters is configured to transmit signals simultaneously.

Optionally, each of the plurality of transmitters transmits an electric field.

Optionally, the stylus is a battery operated stylus.

Optionally, the system comprises a look-up-table relating the geometric relationship between the projected locations to an orientation of the stylus.

According to an aspect of some embodiments of the present invention there is provided a method for tracking orientation of a stylus interacting with a digitizer sensor, the method comprising tracking a projected location of each of two transmitting elements embedded in a stylus, wherein each of the two transmitting elements transmit a signal while the stylus is interacting with a digitizer sensor and wherein the two transmitting elements are displaced from each other, tracking at least one geometric relationship between the projected location of each of two transmitting elements, and determining information relating to three dimensional orientation of the stylus with respect to a sensing surface based on the geometric relationship determined.

Optionally, the at least one geometric relationship tracked includes a distance between the projected location of each of two transmitting elements.

Optionally, the at least one geometric relationship tracked is angle between an axis of the digitizer sensor and a line defined by the projected location of each of two transmitting elements.

Optionally, one of the two transmitting elements transmits a signal around a tip of the stylus.

Optionally, the method comprises differentiating between a signal transmitted from the transmitting element that transmits a signal around a tip of the stylus and the other one of the two transmitting element.

Optionally, the method comprises identifying an area on the digitizer sensor in which signals from one of the two transmitting elements is received and determining a feature of a spatial pattern of the signals received in the area identified.

Optionally, the method comprises estimating a height of the transmitting unit based on the feature determined.

Optionally, the method comprises tracking a tilt of the stylus with respect to a surface of the digitizer sensor.

Optionally, the method comprises determining a slope of a line defined between the projected locations of each of two transmitting elements.

Optionally, the method comprises tracking an orientation of the stylus with respect to an axis of the digitizer sensor based on the slope.

Optionally, the method comprises tracking a projected location of each of three transmitting elements embedded in a stylus, wherein one of the three transmitting elements transmits a signal around a tip of the stylus and wherein the other of the three transmitting elements transmits a signal from a position off a longitudinal axis of the stylus.

Optionally, the method comprises defining a first line between the projected locations of the other of the other of the three transmitting elements and defining a second line between the projected location of the transmitter around the tip and the first line.

Optionally, at least one geometric relationship tracked is a length of the second line.

Optionally, at least one geometric relationship tracked is at least one of a length of the first line and an angle between the first and second line.

Optionally, the method comprises characterizing a users manipulation of the stylus during interaction based on at the least one geometric relationship.

Optionally, the method comprises characterizing a users manipulation of the stylus while providing a signature based on at the least one geometric relationship.

Optionally, the method comprises identifying a user manipulating the stylus based on at the least one geometric relationship.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
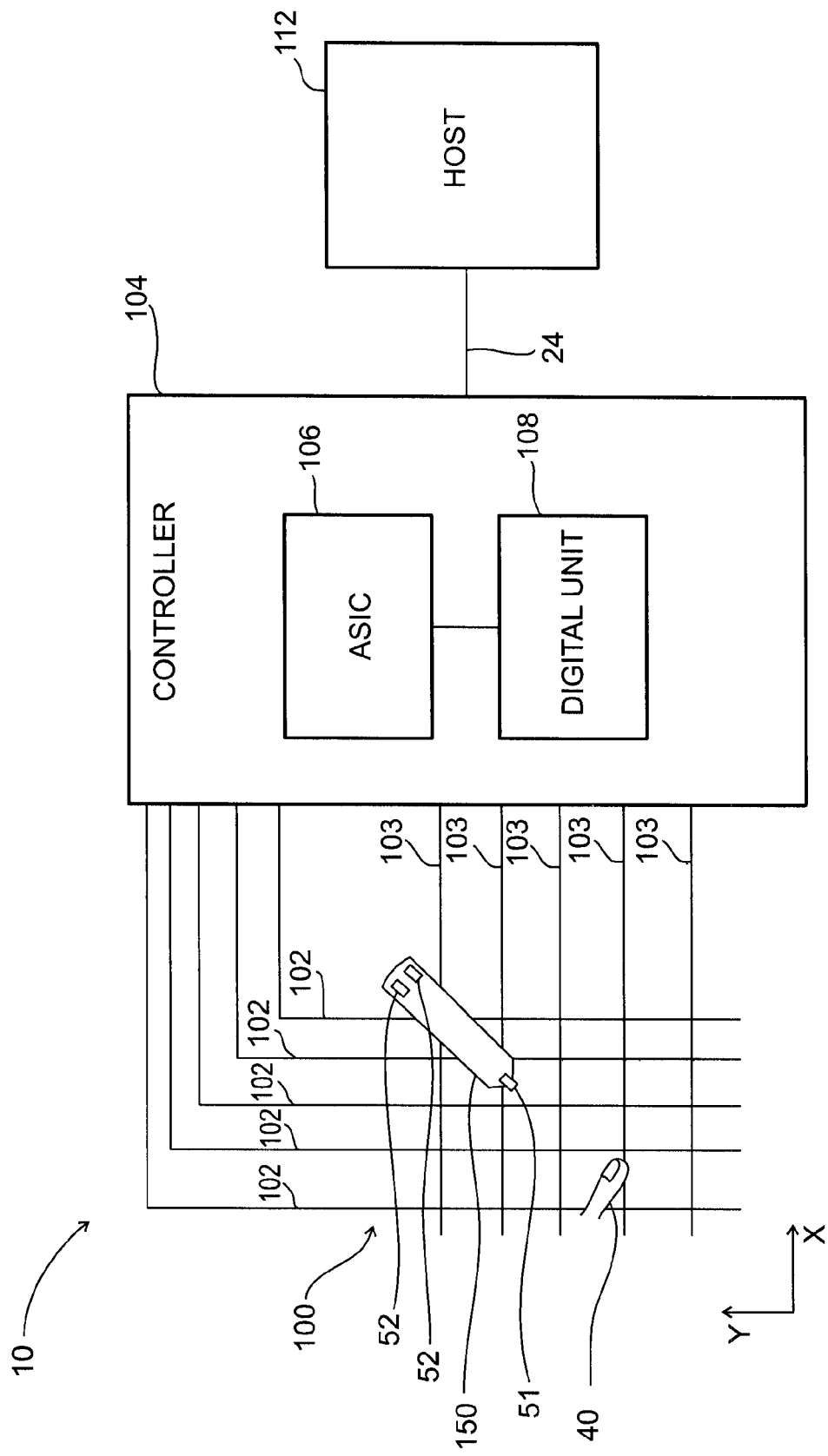
FIG. 1 is a simplified block diagram of an exemplary digitizer system in accordance with some embodiments of the present invention.

The present invention, in some embodiments thereof, relates to a digitizer system and, more particularly, but not exclusively, to a stylus operated digitizer system.

According to some embodiments of the present invention, an object for interacting with a digitizer sensor emits signals, radiations and/or energy from a plurality of distinct locations over the object that can be picked up at different respective locations on a digitizer sensor. According to some embodiments of the present invention, the digitizer system identifies the respective locations on the digitizer sensor and determines three-dimensional related information regarding position and orientation of the object. Optionally signal strength and/or spatial pattern of each of the detected signals is additionally analyzed to determine additional information, such as information related to a height of the object with respect to the digitizer sensor.

According to some embodiments of the present invention, the digitizer system analyzes a geometric relationship between detected signal locations on the digitizer sensor. According to some embodiments of the present invention, an angle of the object with respect to the sensing surface of the system, an angle of the object with respect to an axis of the sensing surface and/or an angle of rotation of the object about it longitudinal axis is determined based on analysis of the geometric relationship between the detected signal locations. Optionally, angle(s) of an object interacting with the digitizer system is tracked and used to identify gestures performed with the object, to interpret commands and/or to determine an operational mode of the object.

According to some embodiments of the present invention, the emitted signals are electric fields. Optionally, an electric field emitted by a transmitter is concentrated over a defined volume and/or area, e.g. the electric field source is a concentrated source. In some exemplary embodiments, one or more of the emitted signals have a frequency, amplitude and/or encoding that is different from a frequency, amplitude and/or encoding of another emitted signal, so that signals emitted from different transmitters can be distinguished from one another. Optionally, one or more of the emitted signals are emitted at different time frames. Optionally, at least one of the emitted signals is other than an electric field, e.g. an optical signal, an acoustic signal, or a magnetic field. In some exemplary embodiments, operation of one or more transmitters can be selectively switched ON/OFF, e.g. by a user. Signals emitted from the transmitters may be emitted simultaneously, consecutively, and/or intermittently, e.g. in response to a query. In some exemplary embodiments, the object is battery operated device. Optionally, the object is asynchronous device, e.g. operates independently from the digitizer system.

According to some embodiments of the present invention, when the object is a stylus, one of the transmitters is positioned near or at a pointing or writing tip of the stylus and its emitted signal is used to define a touch or pointing position of the stylus, e.g. an interacting point of the stylus. As used herein, the term tip transmitter refers to a transmitter positioned substantially at the tip of a stylus. Optionally, a signal emitted by the tip transmitter is sensitive to pressure and the signal varies with pressure applied on the tip, so that a signal transmitted while the stylus is hovering over the digitizer sensor is different from a signal emitted while touching the digitizer sensor. In some exemplary embodiments, the one or more additional transmitters are positioned along a length of the stylus, for example 0-4 cm from the tip e.g., 1.5 cm from the tip, near and/or at an end of the stylus that is distal from the tip. Optionally, at least one of the transmitters positioned distal from the tip emits a signal from a position that is off axis from a longitudinal axis of the stylus.

The present inventors have found that characterized geometric relationship between the detected signal locations can also be used to identify a person interacting with a digitizer via an object such as stylus and/or a signature written with a stylus or other object. It has been observed by the present inventors that a person typically holds and manipulates a stylus in a consistent and unique manner that can be positively distinguished from a manner in which other users hold and manipulate a same stylus. According to some embodiments of the present invention, one or more features and/or parameters related to geometric relationship between detected signal locations are used to characterize a manner in which a person holds and/or manipulates a stylus. Optionally, a manner in which a person holds and/or manipulates a stylus while providing a signature is characterized and used for signature verification. In some exemplary embodiments, characterization is performed during a dedicated session. Optionally, characterization is updated during subsequent sessions, e.g. during operation of the digitizer system.

In some exemplary embodiments, characteristic angles of a stylus with respect to a normal to the digitizer sensor surface while held and/or manipulated by a specific person are defined. In some exemplary embodiments, characteristic angles of the stylus with respect to an axis on the digitizer sensor surface are determined. Optionally, characteristic rotations of the stylus during interaction with the digitizer sensor are determined. Optionally, characteristic standard deviations of one of the angles or rotations tracked are determined. According to some embodiments of the present invention, one or more of the features and/or parameters are saved and used to subsequently identify a person and/or verify a signature.

The present inventors have also found that characterized geometric relationship between the detected signal locations can be used to perform analysis on handwriting, e.g. in graphology and/or in occupational therapy.

Referring now to the drawings, FIG. 1 illustrates a simplified block diagram of an exemplary digitizer system in accordance with some embodiments of the present invention. The digitizer system 10 may be suitable for any computing device that enables interactions between a user and the device, e.g. mobile computing devices that includes, for example, Flat Panel Display (FPD) screens. Examples of such devices include Tablet Personal Computers (PCs), pen enabled lap-top computers, Personal Digital Assistant (PDA), navigation devices, or any hand held devices such as palm pilots and mobile phones. According to some embodiments of the present invention, digitizer system 10 is operative to detect and differentiate between multiple signals emitted from transmitters, e.g. transmitters 52 and tip transmitter 51 included in a single stylus 150 or other object interacting over a digitizer sensor 100. Optionally digitizer system 10 is also operative to detect touch and/or hover of one or more fingers 40 and/or other conductive objects such as game pieces that include a conductive surface positioned over digitizer sensor 100. Optionally, a game piece includes a plurality of transmitters that emit signals to digitizer sensor 100. Typically, digitizer system is configured for multi-touch detection, e.g. detection of simultaneous touch or hover on digitizer sensor 100.

According to some embodiments of the present invention, the digitizer sensor 100 includes a patterned arrangement of conductive lines (sensor lines), which is optionally transparent, and which is typically overlaid on an FPD. In some exemplary embodiments, sensor 100 is a grid based sensor including an array of horizontal conductive lines 103 and an array of vertical conductive lines 102 wherein the conductive lines of each array are electrically isolated from the conductive lines of the other array. Optionally, the conductive lines in each of the horizontal and vertical array are parallel.

According to some embodiments of the present invention, digitizer system 100 includes a controller 104 for operating digitizer sensor 100. Typically, controller 104 has functionality of a controller and processor. According to some embodiments of the present invention, controller 104 includes one or more Application Specific Integration Circuits (ASICs) 106 that are connected to outputs of the various conductive lines in digitizer sensor 100 and function to process the received signals at a first processing stage. Typically, the signals are sampled in ASIC 106 and converted to digital form. According to some embodiments, output sampled by one or more ASICs 106 is forwarded to a digital unit 108, e.g. digital ASIC unit, for further digital processing. Optionally, ASIC 106 additionally triggers one or more of the conductive lines with an oscillating signal having a selected pre-defined frequency or frequencies, e.g. for finger touch detection.

According to some embodiments of the present invention, digital unit 108 determines and/or tracks positions of each signal and/or input received by one or more of transmitters 52 and tip transmitter 51 included in physical objects such as stylus 150 and/or game piece. Typically, the signals transmitted by transmitters 52 and tip transmitter 51 are electric fields. Typically, digital unit 108 determines an interaction point of stylus 150 based on positioning of tip transmitter 51. According to some embodiments of the invention, digital unit 108 is operative to determine and/or track an orientation of stylus 150 and/or one or more pre-defined parameters that provide three dimensional information or rotational information regarding position, orientation or rotation of stylus 150. Optionally, digital unit 108 is operative to decode information encoded in one or more signals transmitted by stylus 150. Optionally, encoding includes information regarding sensed pressure on tip, mode of operation, e.g. right-click mode, left click mode and eraser mode, color for tracing, and/or stylus identification.

Optionally, digital unit 108 additionally determines and tracks positions of physical objects that do not include a transmitter such as a finger and/or conductive object. According to some embodiments of the present invention hovering of an object, e.g. stylus, finger and hand, is also detected and processed by digital unit 108. Typically, calculated position, orientation and/or values of parameters used to characterize input are sent to a host computer 112 via interface 24. Optionally, some and/or all of the processing and/or control functionality of digital unit are performed by host computer 112.

According to some embodiments of the invention, digital unit 108 includes at least a memory unit and a processing unit to store and process information obtained from ASIC 16. Memory and processing capability is also generally included in host computer 112 and ASICs 106. According to some embodiments of the present invention memory and processing functionality may be divided between any two or three of host computer 112, digital unit 108, and ASIC 106 or may reside in only digital unit 108 and host 112. Optionally, ASIC 106 and digital unit 108 is a single unit and/or ASIC, e.g. in small digitizer sensors including a limited number of sensor lines. Optionally, host 112 performs some and/or all the control and/or digital processing functionality.

According to some embodiments of the present invention stylus 150 is battery operated. In some exemplary embodiments, stylus 150 is an autonomous asynchronous stylus that periodically transmits signal bursts and/or pulses.

In some embodiments, digitizer system 10 includes an excitation coil (not shown) that surrounds digitizer sensor 100 and provides an excitation pulse, e.g. in the form of an electric or electromagnetic field for exciting one or more energy pick up circuits in stylus 150 and/or for synchronizing stylus 150 with digitizer system 10. Such an exemplary stylus is described in detail for example in incorporated U.S. Patent Application Publication No. 20080128180.

Reference is now made to FIGS. 2A, 2B, 2C, 2D and 2E showing simplified schematic drawings of exemplary styluses each including a plurality of transmitters in accordance with some embodiments of the present invention. According to some embodiments of the present invention, a stylus, e.g. stylus 151, 152, 153, 154 and 156 includes a signal generating unit 59, a power source 58, an interacting tip 155, a tip transmitter 51, and one or more additional transmitters, e.g. transmitting units and/or transmitters 52, 53 and 54 housed in a housing 55. Optionally, one of transmitters 52, 53 and 54 are positioned on housing 55 and/or partially protrude from housing 55.

According to some embodiments of the present invention, tip transmitter 51 transmits a signal from a vicinity of tip 155. Typically, output from tip transmitter 51 is used by digitizer system 100 to track an interaction point of the stylus. Typically, tip transmitter 51 is symmetrically positioned with respect to longitudinal axis 99 of the stylus. According to some embodiments of the present invention, a pressure sensor and/or tip switch 57 associated with a tip 155 detects pressure and/or depression of tip 155 and output from tip switch 57 alters a signal transmitted by tip transmitter 51 so that a tip state of the stylus can be identified by the digitizer system.

Figures 2A, 2B, 2C:
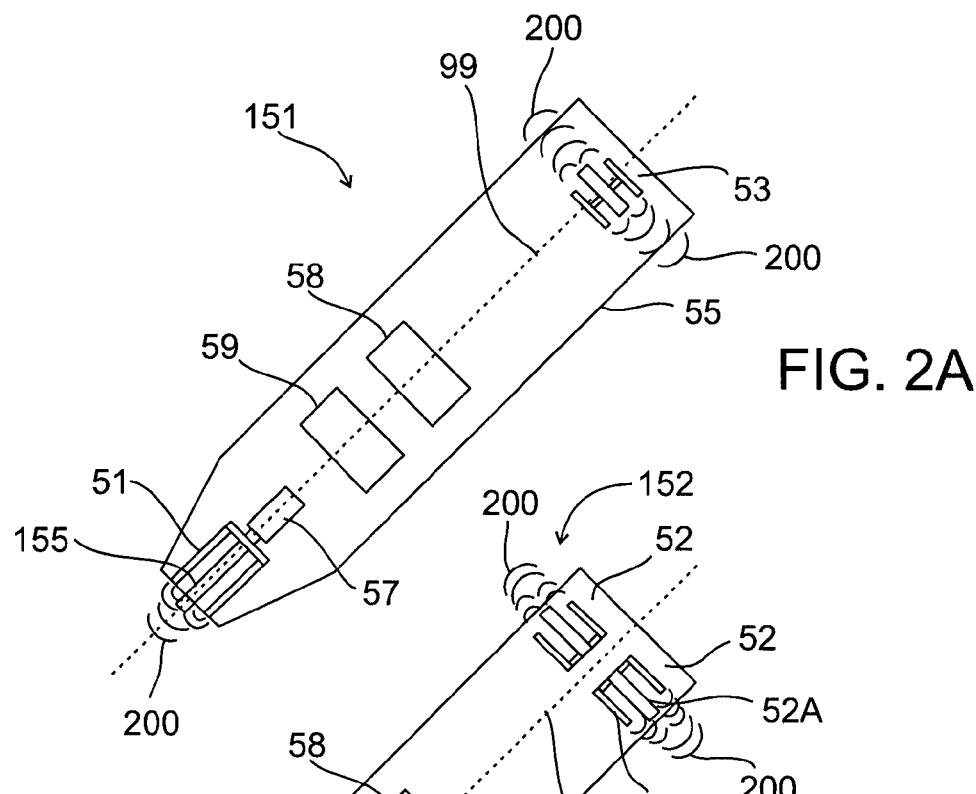
FIGS. 2A, 2B, 2C, 2D and 2E are simplified schematic drawings of exemplary styluses each including a plurality of transmitters in accordance with some embodiments of the present invention.

Referring now to FIG. 2A, in some embodiments of the present invention, stylus 151 includes a transmitter 53 positioned at a distance from tip transmitter 51, e.g. at or near a distal end from tip 155. Optionally, transmitters 51 and 53 are aligned along a longitudinal axis 99 of stylus 151 and transmit a signal that is generally symmetric with respect to axis 99. Typically, the symmetry provides for capturing a same signal from transmitter 53 on an associated digitizer sensor 100 for different angles of rotation of stylus 151 about axis 99. Optionally transmitter 53 is also associated with an eraser switch and/or eraser pressure sensor for sensing an erasing operational mode. Typically, an eraser signal is not transmitted while the tip is depressed, e.g. during tip mode. Optionally the eraser switch and/or eraser pressure sensor is similar to tip switch 57. In some exemplary embodiments, output from the eraser switch alters a signal transmitted by transmitter 53 so that an eraser mode of stylus 151 can be identified by the digitizer system.

Referring now to FIGS. 2B and 2C. In some embodiments of the present invention, stylus 152 and stylus 153 include one or more transmitters 52 that are positioned at a distance from tip 155 along longitudinal axis 99, e.g. off axis from longitudinal axis 99. For clarity reasons, transmitters 52 are drawn at a distal end from tip 155. According to some embodiments of the present invention, one or more of transmitters 52 transmit a signal from a transmission point that is distanced from and/or is off longitudinal axis 99. Optionally, a plurality of transmitters 52 are positioned symmetrically with respect to longitudinal axis 99. In some exemplary embodiments, transmitter 52 directs a transmitted signal in a predefined direction with respect to longitudinal axis 99 at an angle between about 10 and about 90 degrees from longitudinal axis 99.

According to some embodiments of the present invention each of transmitters 51, 52, and 53 provides for transmitting a concentrated electric field between a central conducting element 52A and an encompassing conductive element 52B. Optionally conductive element 52B only partially encompasses conductive element 52A. In some exemplary embodiments, for tip transmitter 51, the central conducting element 52A is the tip 155 and/or extends from tip 155. Typically, a signal generated by signal generator 59 is coupled on one end to central conducting element 52A and on another end to conductive element 52B to generate an electric field 200 between central conducting element 52A and conductive element 52B. Details describing an exemplary method for creating a concentrated electric field in a stylus are described in more detail in incorporated U.S. Pat. No. 7,292,229.

According to some embodiments of the present invention, a signal generated by signal generator 59 is transmitted via each of transmitters 51, 52 and 53 so that all the transmitted signals, e.g. electric field are identical. Optionally, one or more of the transmitters are constructed with a unique geometry, so that the electric field emitted from one or more of the transmitters can be distinguished from the other transmitters. Different geometries can include a different distance between central conducting element 52A and conductive element 52B, a different length of central conductive element 52A, a different shape of conductive element 52B, or other differences. In some exemplary embodiments, signal generator 59 generates a unique signal for each or some of the transmitters and/or introduces a unique encoding for each or some of the transmitters.

Figure 2D:
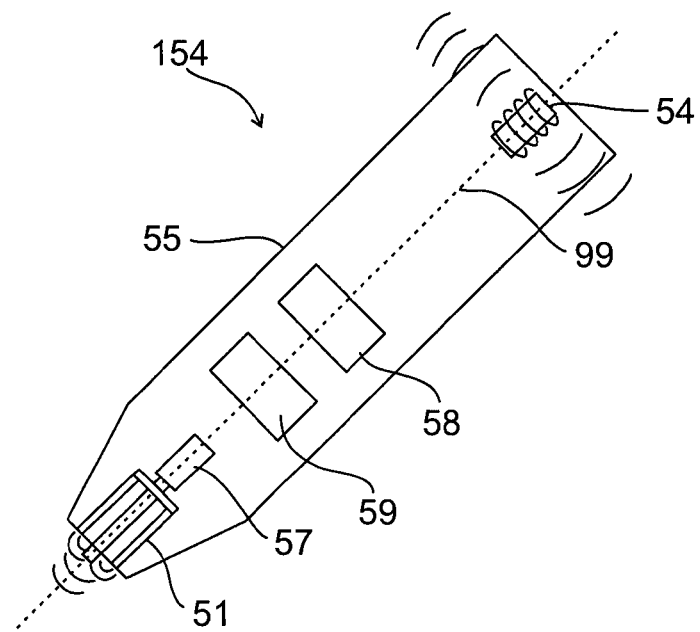

Referring now to FIG. 2D, in some exemplary embodiments a stylus 154 includes one or more additional transmitters 54 for transmitting an electromagnetic signal including a coil wrapped around a core, e.g. a ferrite core. Optionally, transmitter 54 is part of energy pick up unit including a resonating circuit.

Figure 2E:
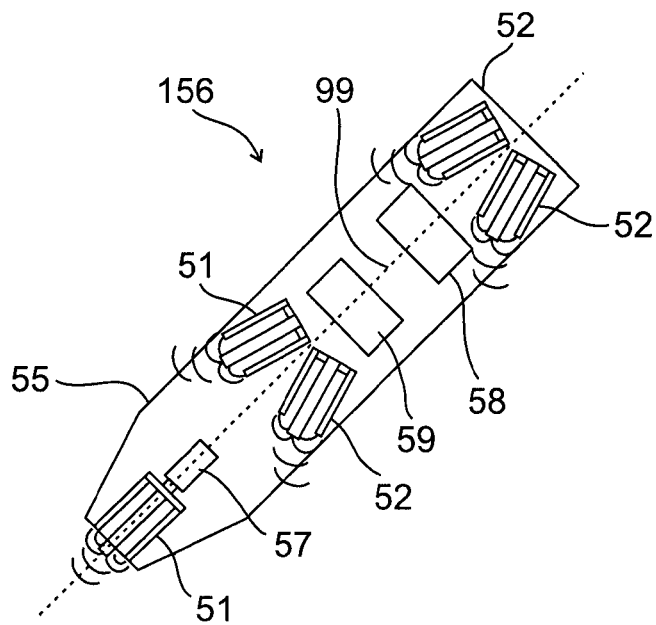

Referring now to FIG. 2E, in some exemplary embodiments, a stylus 156 includes a plurality of transmitters 52 displaced along a length of stylus 156 or other object configured for interacting with digitizer sensor 100. Typically, positioning of each of the transmitters in the stylus, e.g. relative positioning between each of the transmitters is pre-defined and stored in digitizer system 10.

Figure 3:
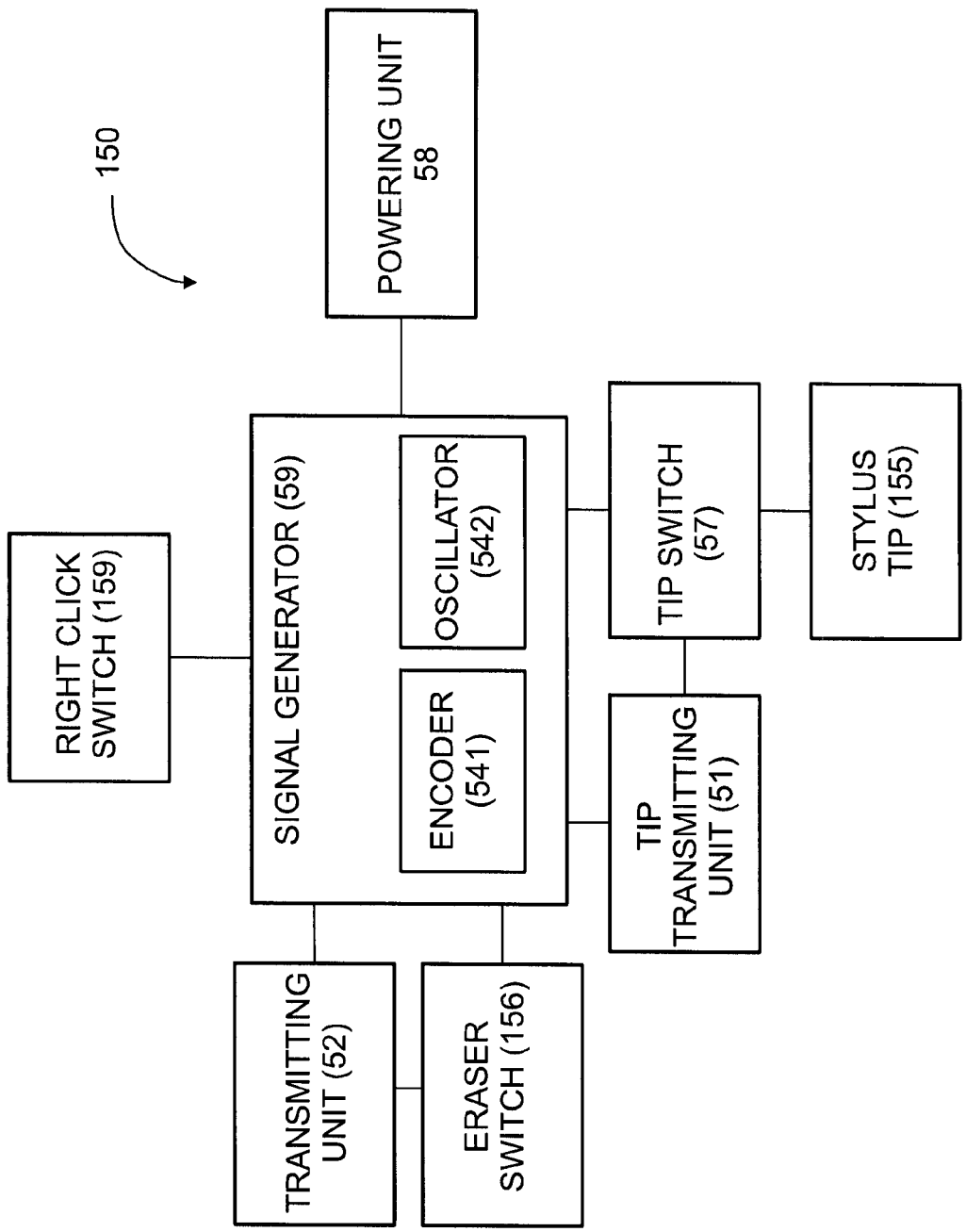
FIG. 3 is a simplified block diagram of elements included in an exemplary stylus in accordance with some embodiments of the present invention.

Reference is now made to FIG. 3 showing a simplified block diagram of elements included in an exemplary stylus in accordance with some embodiments of the present invention. According to some embodiments of the present invention, a stylus 150 includes a signal generating unit 59, a stylus tip 155, a tip transmitting unit 51, at least one additional transmitter and a powering unit 58. Typically stylus 150 provides full mouse emulation and additionally includes a tip sensor and/or switch 57 associated with tip 155 to differentiate between a touch and hover state of tip 155, a right click switch 159 associated with a user controlled switch to identify a right click state of the stylus, and optionally an eraser sensor and/or switch 156 to identify an eraser mode of the stylus, e.g. when an end of the stylus distal from the tip is touching digitizer sensor 100. Optionally tip sensor and/or switch 57 is an optical based switch and/or sensor that detects small movements of tip 155 in response to pressure applied. Optionally, eraser sensor and/or switch is likewise associated with an element that moves in response to applied pressure that can be sensed with an optical based switch. Further details describing an optical based switch for detecting tip depression can be found in incorporated U.S. Patent Application Publication No. 20100051356.

According to some embodiments of the present invention, signal generator 59 includes an oscillator 542 for generating a signal to be detected by digitizer sensor 100, e.g. an AC signal. Optionally, signal generator 59 additionally includes one or more encoders 541 for encoding the AC signal. Optionally, a signal emitted from the tip transmitter from a point of origin T1 is encoded. Optionally encoding can be one of Amplitude Shift Keying (ASK), Phase Shift Keying (PSK) and Frequency Shift Keying (FSK) encoding. In some exemplary embodiments, encoder 541 receives input regarding the state of one or more of the switches, e.g. tip switch, eraser switch and right click switch, and encoder 541 encodes the signal to indicate the state of one or more of the switches. Alternatively, output from one of the sensors alters a signal generated by signal generator 59. Optionally, the encoded data encodes information regarding stylus ID, transmitter ID and/or other parameters such as user selected color or width, e.g. selected with a dedicated color/width switch.

According to some exemplary embodiments, a same AC signal is provided to each of the transmitting units, e.g. transmitting units 52 and tip transmitting unit 51. In some exemplary embodiments, the signals transmitted to the different transmitting units differ in one or more frequency, amplitude and phase and can thereby be distinguished from one another. Optionally, encoding is used to differentiate between the signals transmitted from the different transmitters. Optionally, at least one of the transmitting units, e.g. tip transmitting unit 51 is encoded. Optionally, each transmitting unit is encoded separately, e.g. with a dedicated encoding and output from each of the transmitting units can be differentiated from one another based on the encoding.

According to some embodiments of the present invention, powering unit 58 is powered with one or more batteries, e.g. 4A Alkaline batteries that are optionally rechargeable. Optionally, powering unit 58 is additionally and/or alternatively powered with an energy pick-up circuit configured to pick up energy from an excitation coil surrounding digitizer sensor 100. Optionally, stylus 150 further comprises a voltage stabilizer to ensure that the voltage provided by a battery and/or an energy pick up system is constant over time.

In some exemplary embodiments, powering unit 58 includes an energy pick-up circuit which receives energy from an external excitation and supplies the received energy to oscillator 542. Further details describing an energy pick-up circuit that powers an independent oscillator is described in incorporated U.S. Patent Application Publication No. 20080128180

Figure 4:
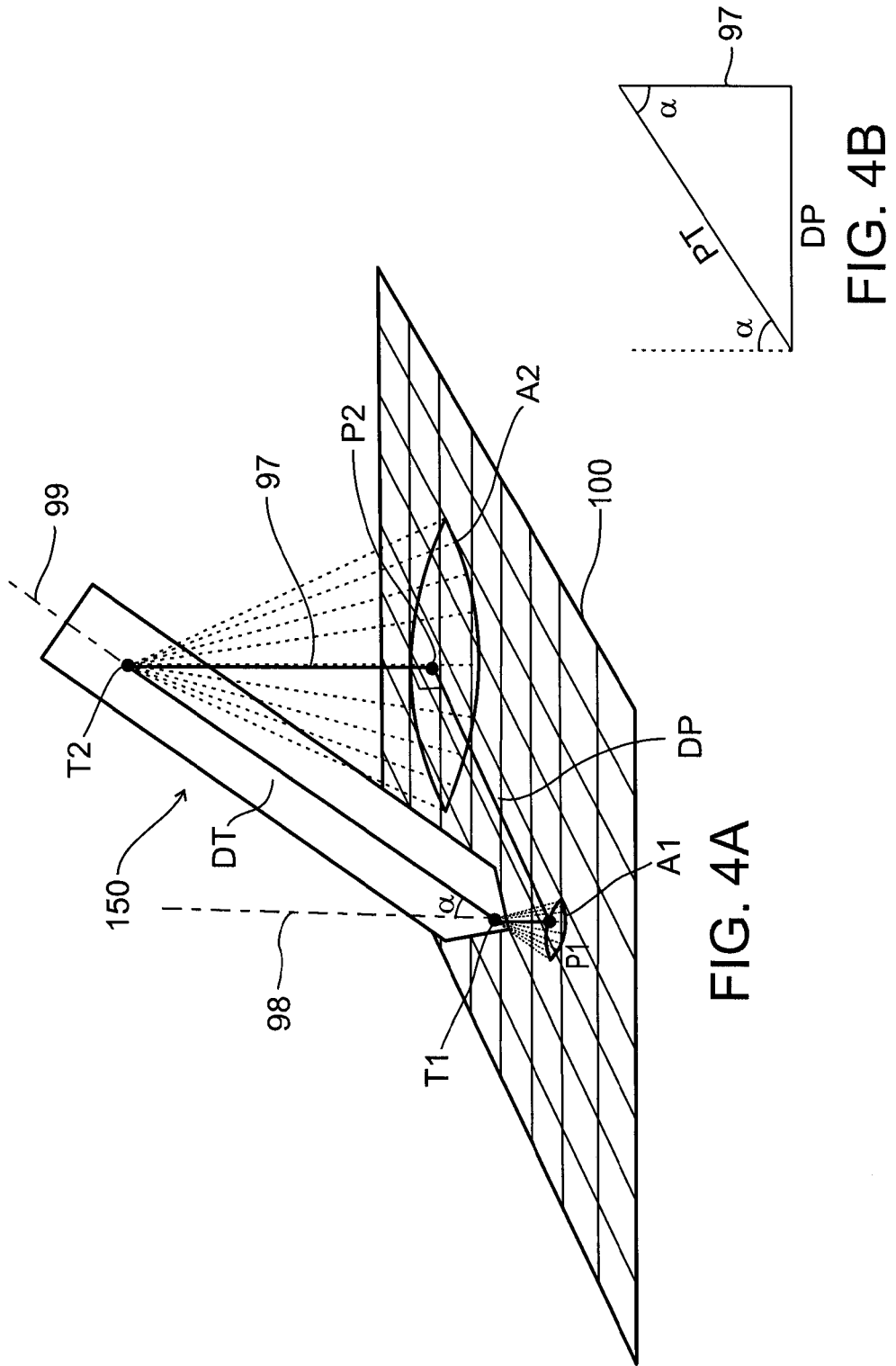
FIG. 4A is a simplified schematic drawing of a stylus including two points of transmission, interacting with a digitizer sensor in accordance with some embodiments of the present invention.
FIG. 4B is an exemplary geometric relationship between an angle of the stylus with respect to a sensing surface and a distance between points of transmission in accordance with some embodiments of the present invention.

Reference is now made to FIG. 4A showing a simplified schematic drawing of a stylus including two points of transmission, interacting with a digitizer sensor in accordance with some embodiments of the present invention. According to some embodiments of the present invention, a stylus 150 includes a tip transmitter that transmits from a point T1 and an additional transmitter that transmits from a point T2 that is displaced by a distance DT from tip transmission point T1. According to some embodiments of the present invention each of transmission points T1 and T2 is positioned and/or aligned along a longitudinal axis 99 of stylus 150. Typically T1 is in the vicinity of a writing tip of stylus 150.

According to some embodiments of the present invention, transmission from a point T1 is detected over an area A1 on digitizer sensor 100 and transmission from a point T2 is detected over an area A2 on digitizer sensor 100. According to some embodiments of the present invention, points P1 and P2 represent projected positions of transmission points T1 and T2 on digitizer sensor 100. Typically, points P1 and P2 correspond to points directly under transmission points T1 and T2 respectively, defined by a normal, e.g. lines 97 and 98 that extend between the transmission point and digitizer sensor 100. In some exemplary embodiments, points P1 and P2 are defined as the points in each area of detection with a highest amplitude signal. Typically, such a point will correspond to a shortest distance between the point of transmission, e.g. T1 and T2 and the digitizer sensor 100. Optionally, points P1 and P2 are determined by weighted averages of amplitudes detected over each of areas A1 and A2 respectively. In some exemplary embodiments, each of points P1 and P2 is defined as a center of mass of areas A1 and A2 respectively. Typically, during interaction of stylus 150, points P1 and P2 are identified and tracked by digitizer system 10.

Reference is now additionally made to FIG. 4B showing an exemplary geometric relationship between an angle of the stylus with respect to a sensing surface and a distance between points of transmission in accordance with some embodiments of the present invention. According to some embodiments of the present invention, in order to track an angle α between a longitudinal axis 99 of stylus 150 and a normal 98 to digitizer sensor 100, a distance DP between points P1 and P2 is compared to a pre-defined and/or known distance DT between transmission points T1 and T2. Typically, distance DT is stored in memory associated with digitizer system 10, e.g. controller 104. According to some embodiments of the present invention angle α between stylus 150 and normal 98 to digitizer sensor 100 is defined by:

$$\alpha = \sin^{-1}\left(\frac{DP}{DT}\right) \qquad \text{Equation (1)}$$

According to some embodiments of the present invention, a distance DT set between transmission points depends on the required resolution for determining tilt on one hand, and on an acceptable amplitude of signal that can be transmitted at transmission point T2 on the other hand. Typically, a signal that is transmitted from a transmitting point is of amplitude 1-30 V, e.g. 15-18 V. Since the distance between transmitter T2 and digitizer sensor 100 typically increases as DT is increased, additional amplification may be required so that area A2 and point P2 can be properly identified. Optionally, a limiting factor for increasing DT can be a limit on an acceptable length of a stylus 150. Optionally, a digitizer sensor can typically detect a signal emitted from a transmitter at a height between 0-40 mm, e.g. 0-15 mm. Typically, an acceptable tradeoff between desired resolution and acceptable radiation levels is defined per application.

According to some embodiments of the present invention, both angle α and a point of interaction, e.g. point P1 of stylus 150 are detected and tracked by digitizer system 10 during interaction of stylus 150 with digitizer sensor 100. Optionally, a look-up-table relating determined distance DP to angle with respect to a normal to digitizer sensor 100 is stored in memory associated with controller 104 (FIG. 1) and is used to define tilt of stylus 150.

In some exemplary embodiments, additional features of a detected signal are determined and tracked. Optionally, an extent of an area, e.g. area A1 and A2 over which a transmitted signal is detected is used to determine a height that stylus 150 and/or a particular transmitter is hovering over digitizer sensor 100. Typically, the area over which a transmitted signal is detected increases as the distance of the transmitting point from the digitizer sensor increases. Optionally a spatial pattern of signals within an area within which a transmitted signal is detected, e.g. area A1 and A2 is characterized and used to estimate a height of stylus 150 and/or a height of particular transmitter in stylus 150. Optionally, larger gradients in a spatial pattern of signal amplitudes over a detection area is associated with lower hovering heights and/or touch, while smoother gradients in spatial pattern of signal amplitudes across an area of detection are associated with higher hovering heights. Details describing height detection based on spatial distribution of U.S. Patent Application Publication No. 20080012835. According to some embodiments of the present invention, more than one parameter is used for detecting a height and/or an angle of a stylus during interaction with a digitizer sensor.

Figure 5:
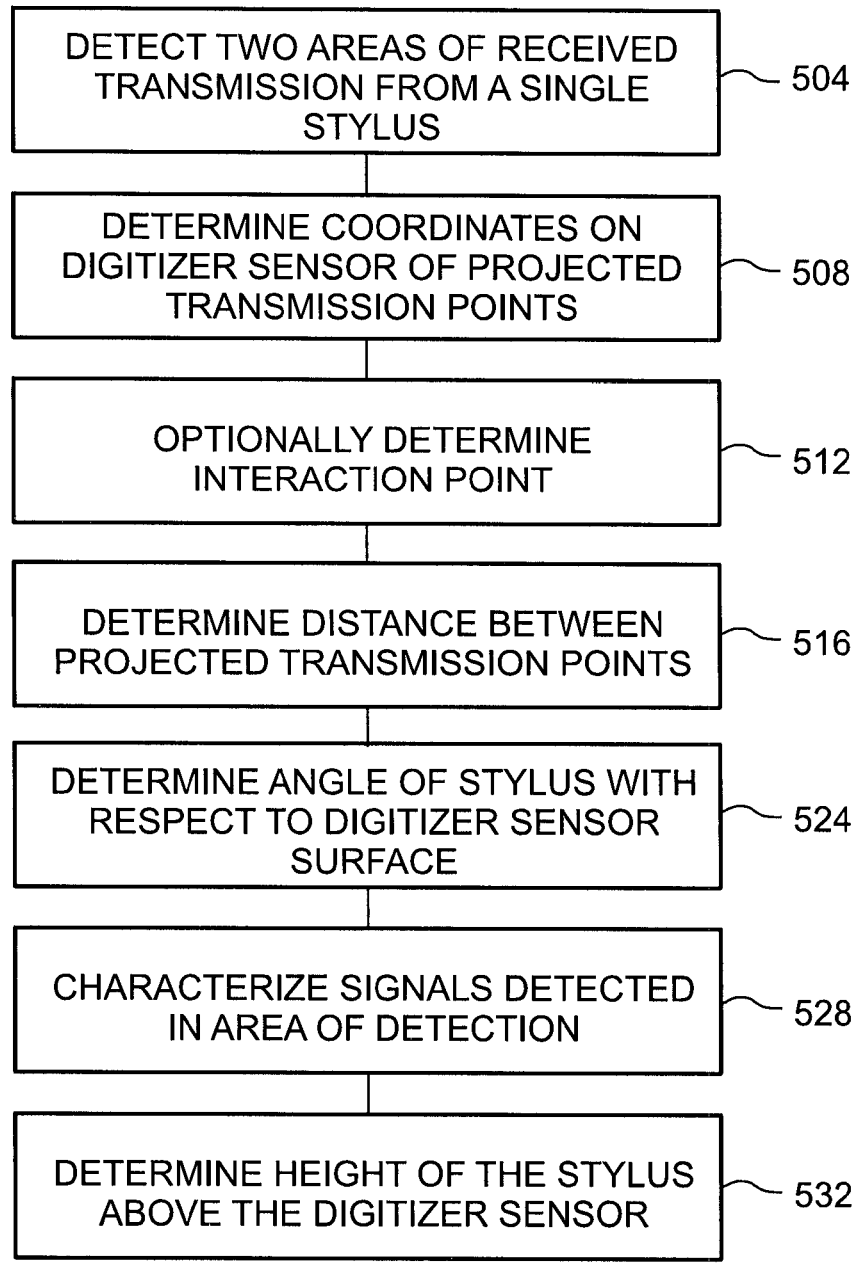
FIG. 5 is a simplified flow chart of an exemplary method from determining an angle of a stylus with respect to a sensing plane of a digitizer in accordance with some embodiments of the present invention.

Reference is now made to FIG. 5 showing a simplified flow chart of an exemplary method for determining an angle of a stylus with respect to a sensing plane of a digitizer in accordance with some embodiments of the present invention. According to some embodiments of the present invention, during operation a digitizer system identifies a first and second area, e.g. distinct areas within which signals from a single stylus are received, where the first area receives a signal emitted from a tip transmitter and the second area receives one or more signals emitted from one or more transmitters distanced from the tip transmitter (block 504). In some exemplary embodiments, the first and second transmitters emit signals simultaneously and the first and second area are detected simultaneously. Optionally, each transmitter emits a signal in turn, in a pre-defined order and the signals from the first and second areas are detected in turn and are identified based on the order of reception.

According to some embodiments of the present invention, coordinates representing projected positions of each transmitter are determined (block 508). Optionally, the coordinates representing projected positions are as point corresponding to a highest amplitude signal received.

Optionally, coordinates of a projected transmission point of tip transmitter are tracked and used to define a point of interaction with the digitizer sensor (block 512). In some exemplary embodiment, the signal emitted from the tip transmitter is identified based on encoding of the signal and/or frequency of the signal. In some exemplary embodiments, the signal emitted from the tip transmitter is identified based on its proximity to the digitizer sensor. Optionally, a height estimation of each transmitting point from the digitizer sensor is determined and used to identify a signal emitted from a tip transmitter.

According to some embodiments of the present invention, a distance between the projected points on the digitizer sensor is detected (block 516). According to some embodiments of the present invention, a relationship between the pre-defined distance between transmission points and the determined distance between the projected points on the digitizer sensor is used to define an angle of stylus with respect to the surface of the digitizer sensor 100 (block 524). Optionally, angle of a stylus interacting with the digitizer is tracked and used to identify a user and/or a signature. Optionally, the detected tilt while a user draws and/or writes specific characters and shapes and/or while a user is requested to make specific gestures is determined and the relationship between the angle of the stylus and a specific input is used to identify a user, a signature, a gesture and/or a command.

Optionally, the signals detected in one or more areas of detection are characterized, e.g. the spatial distribution of the signal amplitudes and/or the signal amplitudes are characterized (block 528) to determine a height of the stylus above the digitizer sensor (block 532). Optionally, the estimated height is also examined and used to interpret input to the digitizer system. Optionally, the estimated height of each transmission point is also examined and used to define tilt of stylus.

Figure 6:
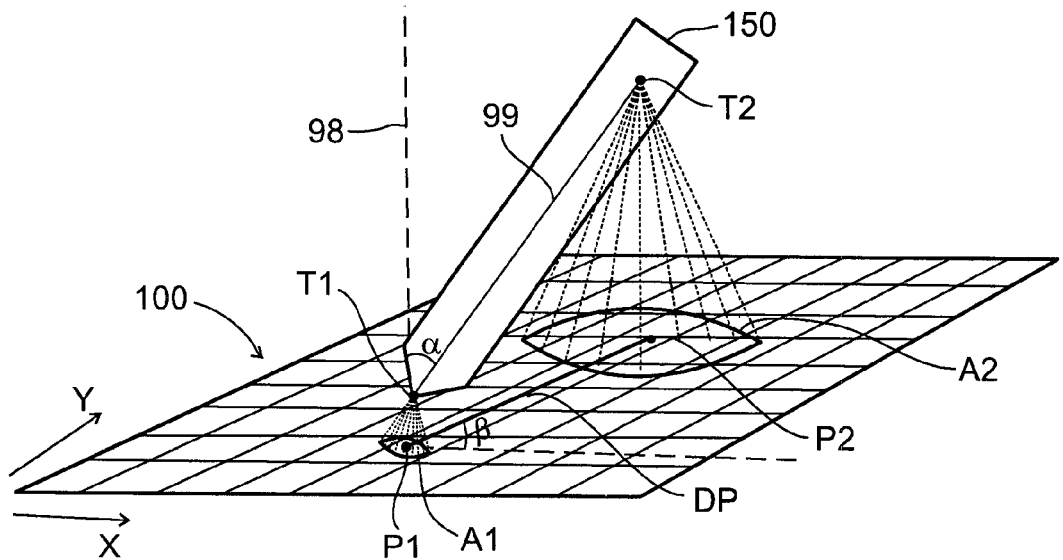
FIG. 6 is a simplified schematic drawing of a stylus held at an angle with respect to an axis of the digitizer sensor in accordance with some embodiments of the present invention.
Figure 7:
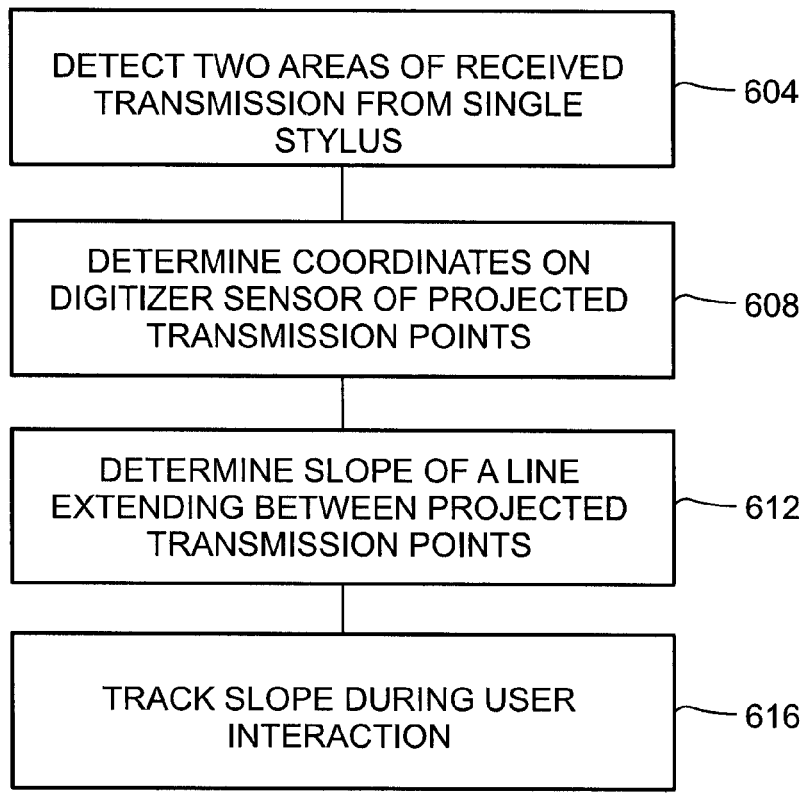
FIG. 7 is a simplified flow chart of an exemplary method for determining orientation of a stylus with respect to an axis of a digitizer sensor in accordance with some embodiments of the present invention.

Reference is now made to FIG. 6 showing a simplified schematic drawings of a stylus held at an angle with respect to an axis of the digitizer sensor and to FIG. 7 showing a simplified flow chart of an exemplary method for determining orientation of a stylus with respect to an axis of a digitizer sensor, both in accordance with some embodiments of the present invention. According to some embodiments of the present invention, both an angle $\alpha$ with respect to a normal 98 and stylus 150, and an angle $\beta$ of a projection of longitudinal axis 99 with respect to an axis of digitizer sensor 100, e.g. an X axis, are detected and tracked. Exemplary methods for determining an angle $\alpha$ with respect to a normal 98 have been discussed herein above. According to some embodiments of the present invention, in order to determine an angle $\beta$ of a projection of longitudinal axis 99 with respect to an axis of digitizer sensor 100, two areas of received transmission, e.g. area A1 and A2 from a single stylus 150 are detected and/or tracked (block 604) and coordinates of points P1 and P2 in each of the area of detection are determined (block 608). Typically, an angle $\beta$ with respect to an axis of digitizer sensor 100 is determined based on signals received from two transmitters displaced along a longitudinal axis 99 of stylus 150 and/or distanced along a length of stylus 150. Exemplary methods for determining coordinates of points P1 and P2 have been discussed in detail herein above.

According to some embodiments of the present invention, a slope of a line DP extending between points P1 and P2, e.g. a projection of longitudinal axis 99 on digitizer sensor 100 is determined and used to define an angle of the stylus, e.g. angle $\beta$ with respect to an axis of the digitizer sensor, e.g. axis X (block 612). According to some embodiments of the present invention, digitizer system 10 detects and tracks an angle of stylus 150 with respect to an axis of digitizer sensor 100 during interaction of stylus 150 with digitizer sensor 100 (block 616). It is noted that digitizer system 10 may for specific applications track only one of angles $\alpha$ and $\beta$ and for other applications may track both angles $\alpha$ and $\beta$.

According to some embodiments of the present invention, tracking angle $\beta$ with respect to an axis of the digitizer sensor is used to determine if a user is left or right handed. Optionally, when a stylus is used to rotate a graphical object, e.g. a three dimensional object, tracking angle $\beta$ provides input regarding a direction of rotation while angle $\alpha$ provides a degree of rotation. Optionally both angle $\alpha$ and $\beta$ are used to characterize movements of a user manipulating a stylus.

Figure 8A:
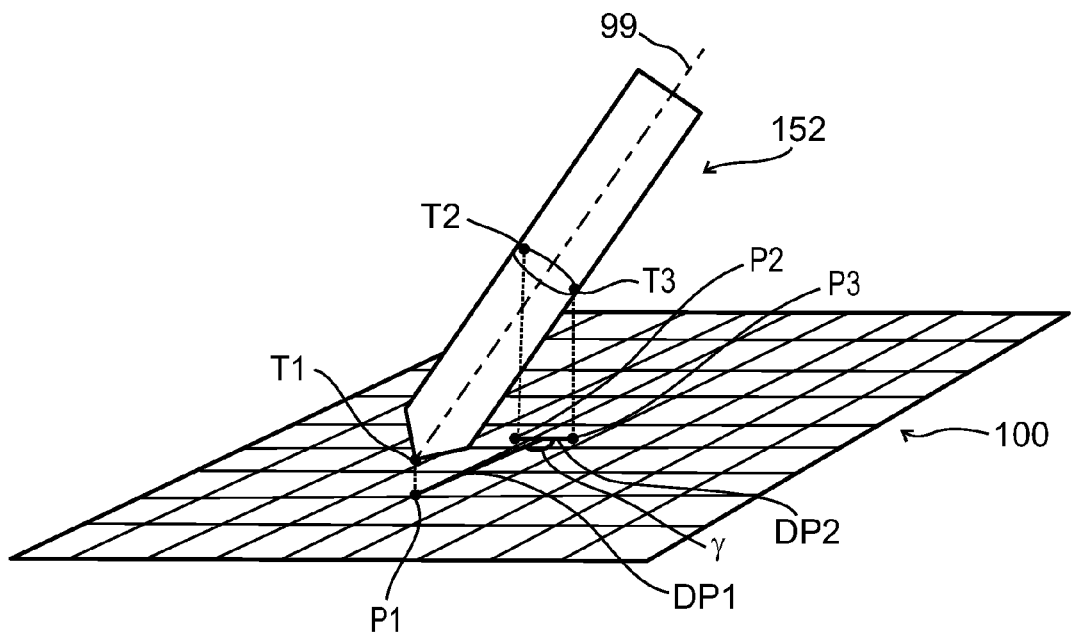
FIGS. 8A and 8B are simplified schematic drawings of a stylus including three points of transmission, the stylus interacting with a digitizer sensor in accordance with some embodiments of the present invention.
Figure 8B:
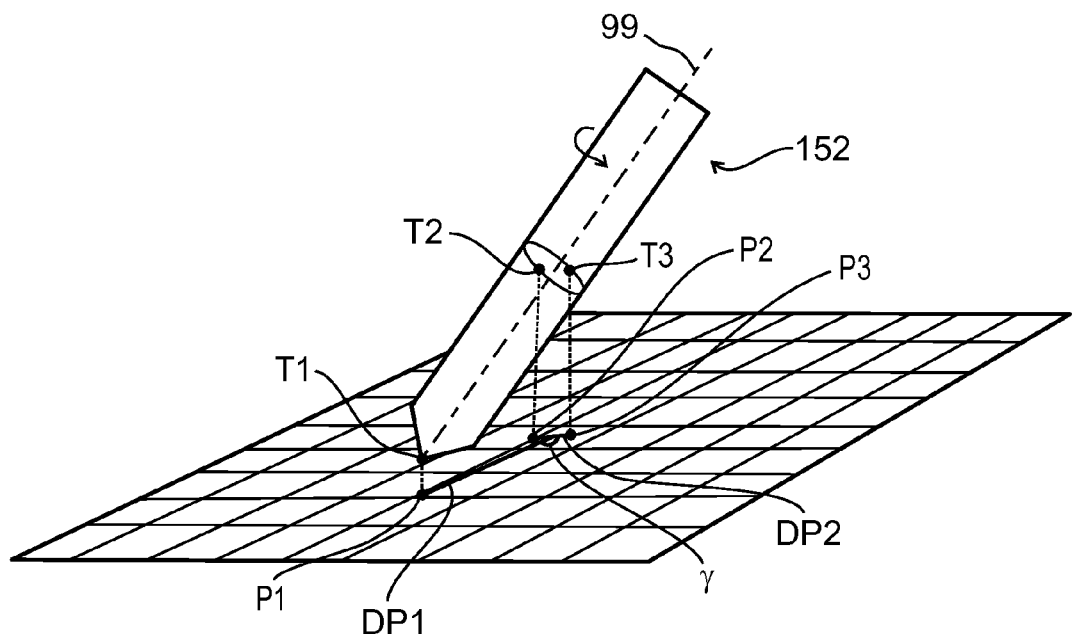

Reference is now made to FIGS. 8A and 8B showing simplified schematic drawings of a stylus including three points of transmission, the stylus interacting with a digitizer sensor in accordance with some embodiments of the present invention.

According to some embodiments of the present invention, a stylus 152 transmits from a tip transmitter at a point T1 and from at least two other transmitters positioned off axis from longitudinal axis 99, e.g. at transmission points T2 and T3 and typically distanced from T1 along a length of stylus 152. The at least two other transmitters may be placed anywhere along a length of stylus 152. Typically, T2 and T3 are positioned close to the tip, e.g. 0.5-3 cm from the tip so that their respective areas of detection can be differentiated from one another. Typically, the area of detection is smaller, e.g. more concentrated when a transmitter is close to digitizer 100, and overlap between the areas of detection is less likely. Typically, a distance between each of T2 and T3 and axis 99 is between 1-10 mm, e.g. 4 mm. Also, signals emitted by transmitters close to the tip may be less prone to be interfered by the user's hand holding the stylus.

According to some embodiments of the present invention, projected positions P1, P2 and P3 are tracked and tilt as well as rotation of stylus 152 about longitudinal axis 99 are determined based on a geometrical relationship between points P1, P2 and P3. According to some embodiments of the present invention, a length of a line DP2 defining a distance between points P2 and P3, a length of a line DP1 defining a distance between point P1 and/or line DP2 and an angle γ between line DP1 and DP2 are tracked and used to determine both tilt and rotation of stylus 152. Typically DP1 is defined as a line extending from P1 and a midpoint, e.g. center of line DP2. Typically, a length of line DP1 increases as a tilt of stylus 152 increases. Typically, length of line DP2 and angle γ is related to rotational orientation of stylus 152 about axis 99 and is used to determine the rotational orientation of stylus 152 about axis 99 and/or changes in the rotational orientation of stylus 152 about axis 99. Optionally, data storing relationship between length of line DP1, length of line DP2 and angle γ and rotational orientation of stylus 152 about axis 99 is stored in controller 104 and used to determine tilt and/or rotational orientation of stylus 152. Optionally, the relationship is defined based on empirical data.

Figure 9:
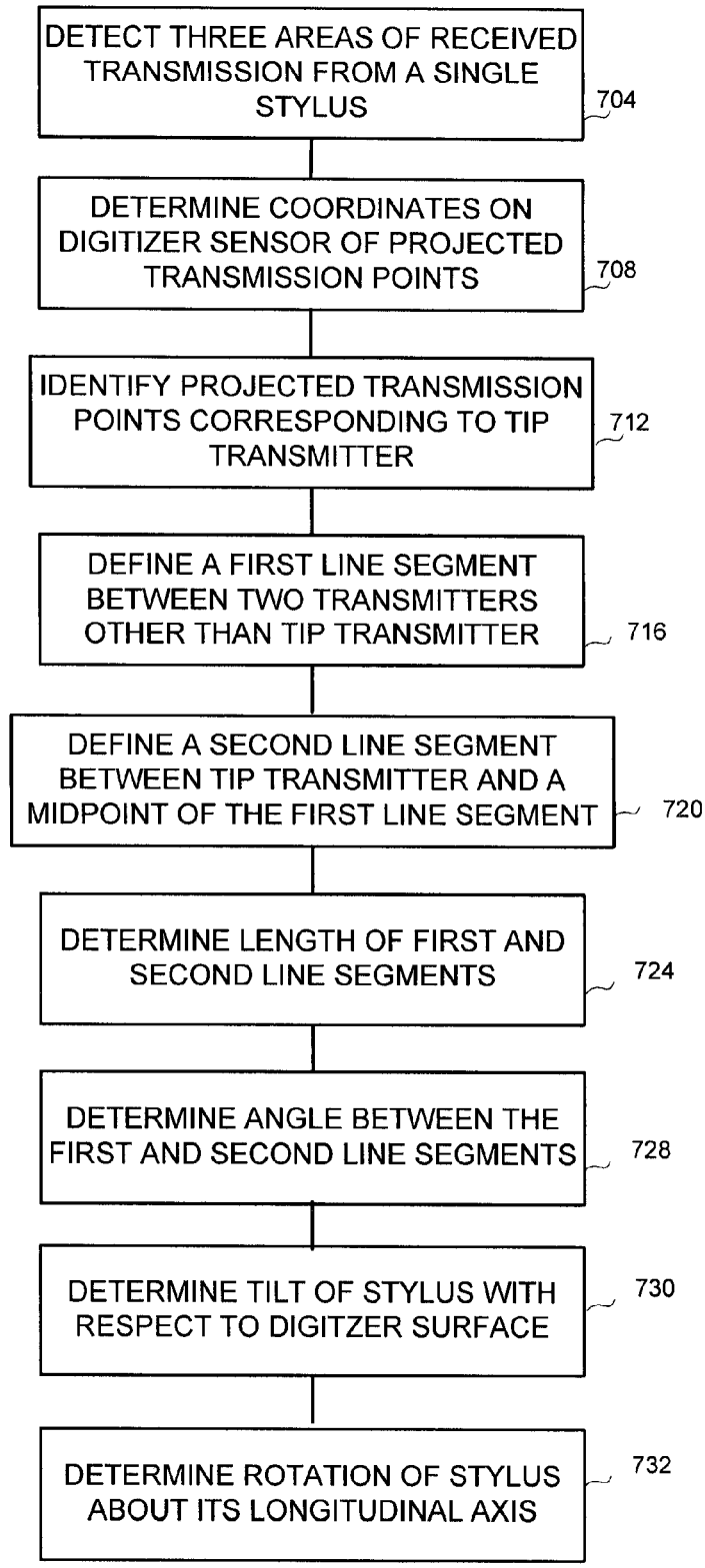
FIG. 9 is a simplified flow chart of an exemplary method for determining rotation of a stylus about its longitudinal axis in accordance with some embodiments of the present invention.

Reference is now made to FIG. 9 showing a simplified flow chart of an exemplary method for determining rotation of a stylus about its longitudinal axis in accordance with some embodiments of the present invention. According to some embodiments of the present invention, during operation a digitizer system identifies three areas of received transmission from a single stylus (block 704). Detected areas may be detected simultaneously and/or in sequence, e.g. separately. According to some embodiments of the present invention, coordinates of projected transmission point for each area are determined (block 708). Typically one of the areas of received transmission corresponds to a signal emitted from a tip transmitter (block 712).

Optionally, the digitizer system defines a first line segment between the projections of the off-axis transmitters (block 716). According to some embodiments of the present invention, a second line segment is defined between a projected tip coordinate and the midpoint of the first line segment (block 720). Typically, the second line segment is defined between a projected tip coordinate and a center point of the first line segment. According to some embodiments, lengths of the first and second line segments are determined and/or tracked (block 724). Optionally, an angle between the first and second line segment is also determined and/or tracked (block 728). According to some embodiments of the present invention, tilt of the stylus is determined based on a detected length of the second line segment (block 730) and rotation of the stylus about its longitudinal axis is determined based on detected length of the first line segment and/or detected angle between the first and second line segment (block 732)

Optionally, more than one line segment defined between a position of the tip transmitter and a position of another transmitter is tracked and used to define an angle of rotation of the stylus about its longitudinal axis. Optionally, an average value obtained from each of the line segments tracked is used to define an angle of rotation. According to some embodiments of the present invention, rotation of the stylus about its longitudinal axis can also be tracked while the tip is moving and/or the tilt of the stylus with respect to the digitizer sensor is changed. Optionally, tracking changes in the angle of a plurality of line segments can be used to differentiate between different types of movements of the stylus.

Figure 10:
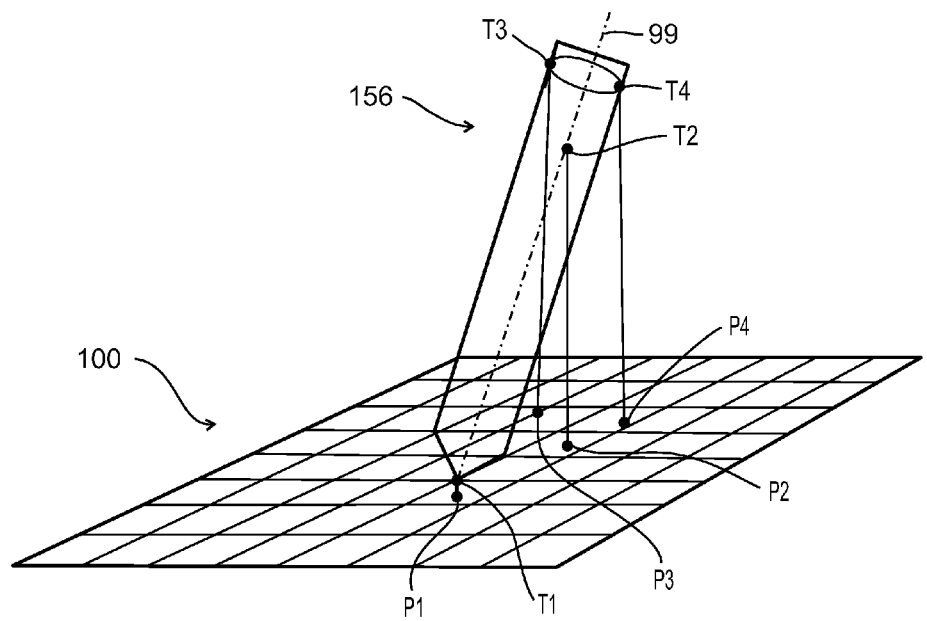
FIG. 10 is a simplified schematic drawing of an exemplary stylus including multiple transmitters aligned on and off a longitudinal axis of the stylus in accordance with some embodiments of the present invention.

Reference is now made to FIG. 10 showing a simplified schematic drawing of an exemplary stylus including multiple transmitters aligned on and off a longitudinal axis of the stylus in accordance with some embodiments of the present invention. According to some embodiments of the present invention, a stylus 156 includes a tip transmitter T1 aligned with longitudinal axis 99, at least one other transmitter T2 distanced from T1 and also aligned with longitudinal axis 99, and one or more transmitters, e.g. T3 and T4 positioned off longitudinal axis 99. In some exemplary embodiments, transmitter T2 provides symmetric radiation with respect to longitudinal axis 99, e.g. radiates 360 degree around longitudinal axis 99. Optionally, transmitter T2 includes a coaxial cable that provides transmission in 360 degrees. Optionally, transmitters T and T4 are positioned at a same distance with respect to tip transmitter T1. In some exemplary embodiments, relative positioning between the transmitting points is stored in memory associated with the digitizer system, e.g. in controller 104 (FIG. 1)

In some exemplary embodiments, relative positioning between projections of T1 and T2 on digitizer sensor 100, e.g. P1 and P2 is used to determine a tilt of stylus 156 with respect to digitizer sensor, and relative positioning of projections of one or more of plurality of transmitters T3 and T4, e.g. P3 and P4 with a projection of tip transmitter T1, e.g. P1 is used to determine a rotation of stylus 156 with respect to its longitudinal axis. Optionally, one or more of tilt with respect to a normal to digitizer sensor 100, angle with respect to an axis of digitizer sensor 100 and rotation of stylus 156 with respect to its longitudinal axis is detected and tracked during interaction between the stylus and the digitizer sensor. Optionally, a look-up-table relating geometric relations to one or more of tilt with respect a normal to digitizer sensor 100, angle with respect to an axis of digitizer sensor 100 and rotation of stylus 156 with respect to its longitudinal axis is stored in memory associated with controller 104 (FIG. 1) and is used to determine information regarding orientation of the stylus. Optionally, the look-up-table is in the form of a matrix where each column entry of the matrix represents a different geometric relationship that can be measured and each row entry represents a corresponding orientation of the stylus that can be derived from the geometric relationship, e.g. tilt, angle with respect to an axis of the digitizer and roll.

Figure 11:
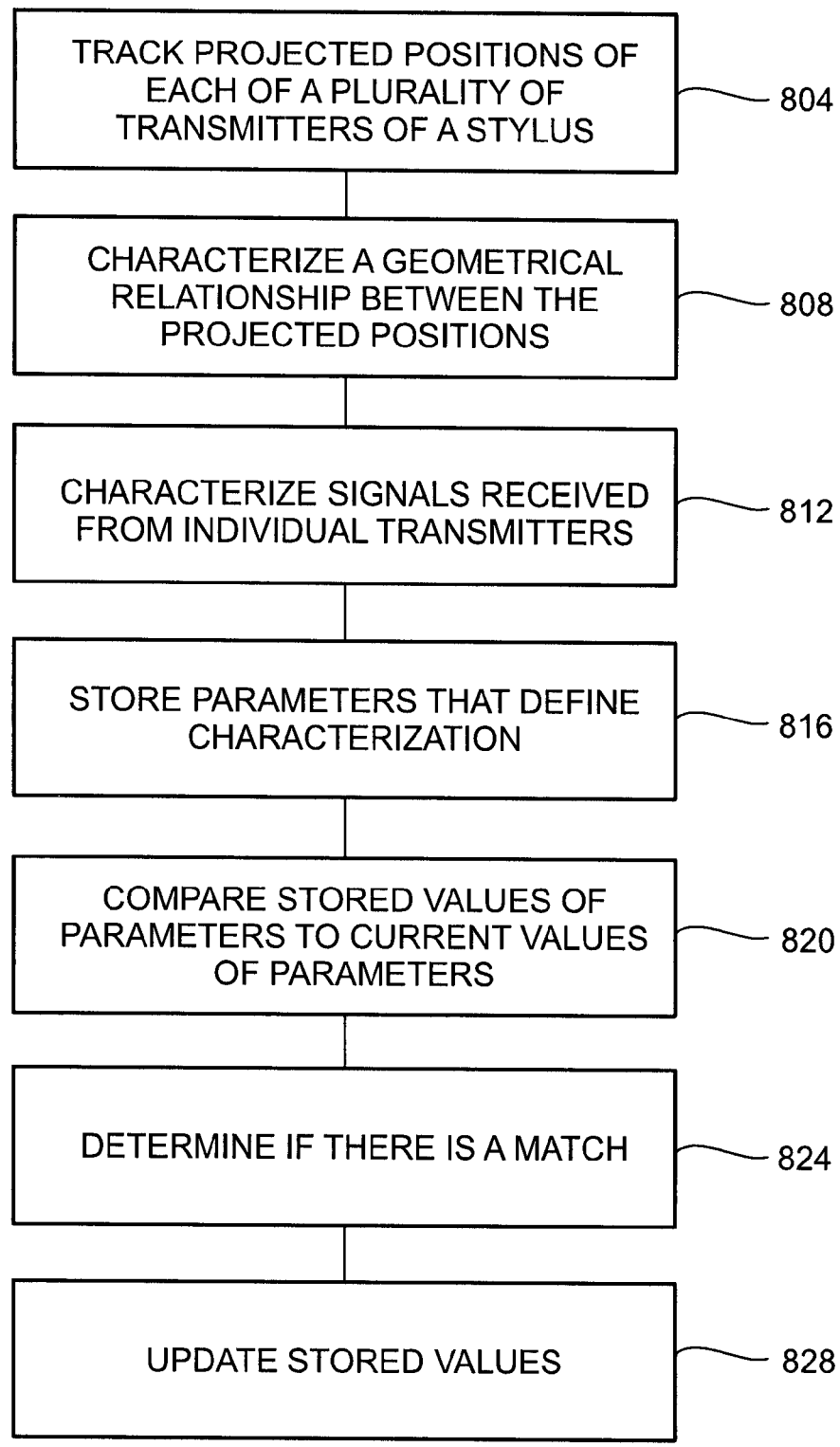
FIG. 11 is a simplified flow chart of an exemplary method for identifying a user and/or a signature in accordance with some embodiments of the present invention.

Reference is now made to FIG. 11 showing a simplified flow chart of an exemplary method for identifying a user and/or a signature in accordance with some embodiments of the present invention. According to some embodiments of the present invention, detected input from a stylus transmitting signals from a plurality of different points is used to identify a person using the stylus and/or to identify a signature made with the stylus. According to some embodiments of the present invention, during a calibration or registration session as user is requested to perform a specific task and/or movement with a stylus and the digitizer system tracks projected positions of each of a plurality of transmitters of the stylus (block 804). According to some embodiments of the present invention, digitizer system 100 defines one or more characteristic geometrical relationships between the projected positions tracked (block 808). Optionally, digitizer system 100 additionally defines one or more features that characterize signals received from one or more of the transmitters (block 812). Optionally, an amplitude of the signal is characterized and/or a spatial pattern of the signal amplitude across an area over which the signal is receives is characterized. According to some embodiments of the present invention, digitizer system stores the features and/or characteristic geometrical relationships, e.g. as parameters (block 816).

According to some embodiments of the present invention, during subsequent operational sessions while a user operates a host computer with digitizer system 10, geometric relationships between projected positions of transmission points are tracked and compared with the stored characteristic geometrical relationships (block 820). Optionally, additional features of the received signals are determined and compared to stored characteristic features. Typically, digitizer system 10 determines if there is a match with one or more of the stored parameters, e.g. geometric relationships and/or features (block 824). Typically, if at least a minimal number of the stored parameter values match the current parameter values then a user and/or a signature is positively identified. Optionally, one or more stored geometric relationships and/or features may be updated while an identified user is interacting with the digitizer sensor (block 828).

It is noted that although most of the embodiments have been described in reference to a stylus, the systems and methods described herein can also be applied to other objects defined for interacting with a digitizer sensor, e.g. such as game pieces.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A digitizer controller comprising:
a circuit configured to:
sample outputs from a plurality of column sensor lines and from a plurality of row sensor lines of a digitizer sensor to detect a first signal emitted from a first transmitter and a second signal emitted from a second transmitter, wherein the first transmitter and the second transmitter are fixed on a stylus and wherein the first transmitter is displaced from the second transmitter by a pre-defined distance;
determine based on the outputs a first area on the digitizer sensor that received the first signal and a second area on the digitizer sensor that received the second signal;
select first coordinates within the first area;
select second coordinates within the second area;
determine distance along the digitizer sensor between the first coordinates and the second coordinates; and
determine angle of the stylus with respect to the digitizer sensor based on comparing the pre-defined distance to the distance determined along the digitizer sensor.

2. The digitizer controller of claim 1, wherein both the first signal and the second signal are detected from same outputs.

3. The digitizer controller of claim 1, wherein the first signal is detected from first outputs and the second signal is detected from second outputs, the second outputs sampled after the first outputs.

4. The digitizer controller of claim 1, wherein at least one of the first signal and the second signal is modulated with information.

5. The digitizer controller of claim 1, wherein the circuit is configured to determine the angle based on an arcsine of the distance determined along the digitizer sensor over the pre-defined distance.

6. The digitizer controller of claim 1, wherein the circuit is configured to determine angle of a projection of the stylus on the digitizer sensor with respect to one of the row and column direction based on comparing slope defined by the first coordinates and the second coordinates.

7. The digitizer controller of claim 1, wherein the first signal is transmitted from a tip of the stylus and wherein the circuit is configured to determine position of the tip based on the first coordinates.

8. The digitizer controller of claim 7, wherein the circuit is configured to distinguish between the first signal transmitted from the tip and the second signal.

9. The digitizer controller of claim 7, wherein the circuit is configured to recognize a gesture performed with the stylus based on both the position of the tip and the angle of the stylus with respect to the digitizer sensor.

10. The digitizer controller of claim 1, wherein the circuit is configured to track the angle of the stylus over time and to verify identify of a user manipulating the stylus to provide a signature based on the signature and the angle tracked.

11. The digitizer controller of claim 1, wherein the circuit is configured to detect from the outputs a third signal emitted from a third transmitter, the third transmitter fixed onto the stylus and displaced from the second transmitter in a direction perpendicular to a longitudinal axis of the stylus by a second pre-defined distance, and wherein the circuit is configured to determine based on the outputs, third coordinates on the digitizer sensor at which the third signal is received.

12. The digitizer controller of claim 11, wherein the circuit is configured to track rotation of the stylus about the longitudinal axis based on comparing changes in distance between the second coordinate and the third coordinates over time.

13. The digitizer controller of claim 1, wherein the circuit is configured to determine based on the outputs first amplitudes in the first area and second amplitudes in the second area and to determine angle of the stylus with respect to the digitizer sensor based on comparing a feature of the first amplitudes with a feature of the second amplitudes.

14. The digitizer controller of claim 1, wherein circuit is configured to determine angle of the stylus with respect to the digitizer sensor based on comparing size of the first area to size of the second area.

15. A digitizer controller comprising:
a circuit configured to:
sample outputs from a plurality of column sensor lines and from a plurality of row sensor lines of a digitizer sensor to detect a first signal emitted from a first transmitter associated with a tip of a stylus and a second signal emitted from a second transmitter, wherein the first transmitter and the second transmitter are fixed on the stylus and wherein the first transmitter is displaced from the second transmitter by a pre-defined distance;

distinguish between the first signal emitted from the tip of the stylus and the second signal;

determine based on the outputs a first area on the digitizer sensor that received the first signal and a second area on the digitizer sensor that received the second signal;

select first coordinates within the first area;

select second coordinates within the second area;

determine distance along the digitizer sensor between the first coordinates and the second coordinates; and determine angle of the stylus with respect to the digitizer sensor based on comparing the pre-defined distance to the distance determined along the digitizer sensor.

16. The digitizer controller of claim 15, wherein both the first signal and the second signal are detected from same outputs.

17. The digitizer controller of claim 15, wherein the first signal is detected from first outputs and the second signal is detected from second outputs, the second outputs sampled after the first outputs.

18. The digitizer controller of claim 15, wherein at least one of the first signal and the second signal is modulated with information.

19. The digitizer controller of claim 15, wherein the circuit is configured to detect from the outputs a third signal emitted from a third transmitter, the third transmitter fixed onto the stylus and displaced from the second transmitter in a direction perpendicular to a longitudinal axis of the stylus by a second pre-defined distance, and wherein the circuit is configured to determine based on the outputs, third coordinates on the digitizer sensor at which the third signal is received.

20. The digitizer controller of claim 19, wherein the circuit is configured to track rotation of the stylus about the longitudinal axis based on comparing changes in distance between the second coordinate and the third coordinates over time.

* * * * *